Sept. 14, 1948.        C. L. LIGHTFOOT, JR                2,449,238
                        FILTRATION APPARATUS
                        Filed Nov. 21, 1947
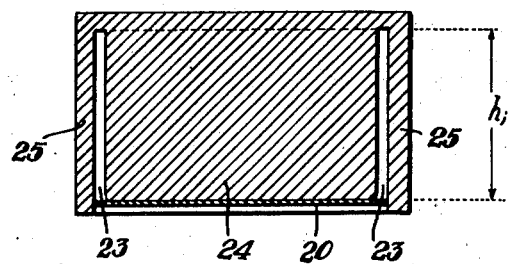
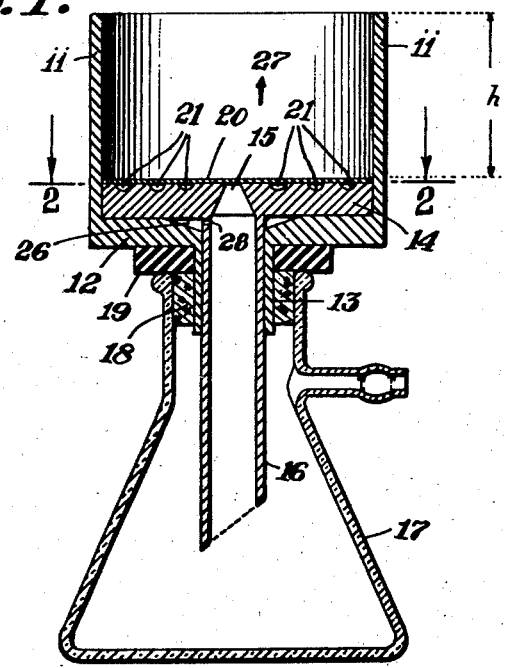
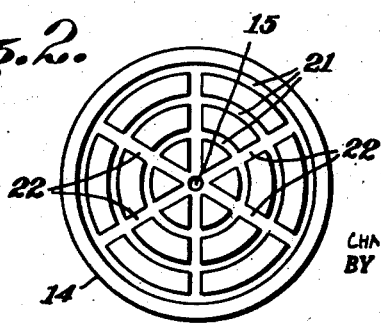
INVENTOR.
CHARLES LEANDRO LIGHTFOOT Jr.
BY Peter H. Smolka Patented Sept. 14, 1948

2,449,238

UNITED STATES PATENT OFFICE 2,449,238

FILTRATION APPARATUS

Charles Leandro Lightfoot, Jr., Summit, N. J.

Application November 21, 1947, Serial No. 787,371

6 Claims. (Cl. 210—155)

This invention relates to a filtration apparatus and more particularly to an improved filter funnel assembly.

An object of the invention is to provide a filter funnel permitting rapid and quantitive recovery of the precipitate. Another object is to provide an apparatus having easy access to all of its parts, thereby facilitating the cleaning thereof. A further object is to provide simple means whereby superatmospheric pressure can be applied to the mixture being filtered.

These and other objects will become apparent from the following description and the accompanying drawing in which one embodiment of the invention is illustrated.

In the drawing

Fig. 1 shows a central vertical section of a filter assembly embodying one form of my invention;

Fig. 2 is a horizontal section taken along the line 2—2 indicated in Fig. 1, and illustrates one suitable form of the filter disc used in my invention, the casing snugly surrounding the disc being omitted from Fig. 2 for the sake of simplicity; and Fig. 3 shows in central vertical section an accessory device, i. e. a loading device referred to in the specification.

As illustrated in the drawing, the novel apparatus includes a precisely constructed casing or funnel member of upright cylindrical or similar shape having longitudinal walls 11 and a horizontal bottom or shoulder member 12. Said shoulder member has a central opening from which descends a tubular stem or collar 13. The casing is preferably cylindrical as shown, but it may have any other preferably symmetrical cross-section or base, for example in the form of a square or other polygon. The casing may be of any desired size ranging conveniently from a diameter of about ⅕ inch to 10 inches or even larger, being preferably of a size for which standard filter papers are available. The side walls 11 of the casing are of correspondingly appropriate height, e. g. 1 to 5 inches.

The second essential element of the funnel assembly is a piston member movable along the line indicated by arrow 27 and consisting of ejector disc 14 which has a small central opening 15 and a discharge tube or tubular stem 16 depending therefrom as shown and intended to extend into a vacuum filter flask 17 through an air-tight stopper 18 and/or washer 19. The filter disc 14 is so constructed as to fit tightly or piston-like within the cylinder walls 11, i. e. leaving a clearance as small as practical between the periphery of disc 14 and the inner surface of walls 11.

As shown in Fig. 1 a filter paper 20 of substantially the same size as the bore of the cylinder is supported on the upper surface of the piston disc 14 while this disc itself is supported by the shoulder 12 of the casing. The contacting surface of the shoulder 12 is preferably machined to form a tight seat for the lower surface of disc 14, which is also preferably machined. The co-operating surfaces of disc 14 and shoulder 12 may be plane, but alternatively they may be at least partly conical as shown. Alternatively, a gasket of appropriate material may be interposed between shoulder 12 and piston disc 14 so as to assure a tight seal.

The filter paper 20, resting on top of disc 14 when in operative position, should be at least large enough to cover all of the circular grooves 21 of disc 14. However, where analytical recovery of the precipitate is desired, it is preferred to employ a filter paper 20 which has a diameter slightly larger than the bore of the casing 11. This oversize paper can be simply put in place by placing it on the upper rim of the casing 11 and thereafter depressing it into position by an appropriate plunger, e. g. by a duplicate of the slidable piston member 14. Alternatively, a separate simple loading device may be used as illustrated in Fig. 3. This device may consist of a cylindrical block divided by a deep circular groove 23 into an inner cylindrical portion or anvil 24 and an outer annular portion 25. The circular groove 23 is wide enough to be freely slidable over casing walls 11. The inner portion 24 has a heighth which is at least equivalent to the distance $h$, shown in Fig. 1. To use this loading device, a piece of filter paper 20 is placed on the anvil 24 and the casing of the funnel assembly illustrated in Fig. 1 is pressed into groove 23 in an inverted position until paper 20 is placed against disc 14, the outer edges of the paper being cupped slightly in the process. Thereafter, the loading device is withdrawn and the funnel containing a slightly cupped filter paper is ready to operate.

This use of slightly oversized cupped filter paper has been found to be so unexpectedly effective as to make the apparatus suitable for analytical work involving the quantitative weighing of precipitates. The unexpectedly complete recovery of the precipitates is apparently due to the fact that when such a cupped filter paper is being pushed from the casing it exerts a positive thrust in the direction of the walls, thereby removing any precipitate adhering to the side walls. Accuracy of up to 1 mg. has thus been obtained readily.

The piston disc 14 is provided with an intercommunicating system of concentric circular grooves 21 and of radial grooves 22 converging into the opening 15 as shown in Fig. 2 so as to permit a substantial portion of the surface of filter paper 20 to be acted upon by the vacuum applied from the filter flask 17. The width of the grooves should desirably range between 0.01 inch to 0.025 or 0.050 inch, the maximum tolerable width of the grooves being determined as the distance which will not allow the spanning portions of the filter paper to be drawn into the grooves by suction to such an extent as to cause rupture of the paper or otherwise adversely affect the filtration. Thus it will be seen that the ultimate width is dependent on the strength of the filter paper which is intended for use in the funnel. The depth of the grooves may be 2 to 3 times their width, and preferably the grooves are provided with a rounded bottom to facilitate cleaning. The size of opening 15 is again determined by the strength of the filter paper for which the apparatus is to be designed, but usually it will be found that it should not have a smaller diameter than about 0.025 inch. Alternatively, the single opening 15 may be replaced by an annular series of perforations of appropriate size, or by a circular slot, into which the individual radial grooves are arranged to discharge.

Furthermore, especially in intermediate funnel sizes, e. g. in funnels of about ½ to 4 inch diameter, the circular grooves 21 can be completely omitted leaving a drainage system consisting only of radial grooves 22 and central opening 15. In still smaller sizes, an opening without any groove system has been found satisfactory.

In still another modification the grooved disc 14 may be replaced by a perforated disc of equal size or, in case it is not desired to use any filter paper, by a disc of sintered metal or glass, or of porous porcelain, in which case the bearing surface of shoulder 12 is made narrow and the remainder of the inner surface of the shoulder is beveled or otherwise shaped to form a cavity 26 between the disc 14 and the shoulder 12 to allow the filtrate to pass downwardly through the perforations or pores of the disc 14 into the said cavity and thence through a slot or series of slots 28 into the tubular stem 16. Indeed, even where disc 14 is merely grooved as shown in the drawing, it may be desirable to provide a slot 28 in the wall of stem 16 to hold the disc more firmly and tightly against shoulder 12 by the action of the vacuum. Where, as described above, a perforated or porous piston disc 12 is used the tubular stem 16 may be replaced by a solid stem passing freely through the collar 13 thus leaving a passage for the liquid between said stem and said collar.

The casing 11, 12 and disc member 14 are conveniently made of metal such as stainless steel, aluminum or Monel, drawn seamless steel tubing being especially suited for the casing since often no additional machining of the wall surfaces is necessary to assure the required smooth inner surface. However, instead of metal, all or part of the apparatus may be made from porcelain, glass or suitable plastics, or any desired combination of any of the aforementioned and similar materials.

In the operation of my novel apparatus, a dispersion containing a solid phase dispersed in a liquid phase is poured onto filter paper 20 supported on disc 12 within cylinder walls 11 and vacuum is applied to flask 17, thereby forcing the liquid downwardly through filter paper 20, grooves and opening of disc 14 and tube 16 into flask 17 while the solid precipitate is retained on top of filter paper 20. At the end of the filtration, the vacuum is disconnected and the funnel assembly removed from flask 17. Thereupon, by pressing upwardly against tube 15 disc 14 is slid out of the casing defined by walls 11 in the direction of arrow 27. In this manner the tightly fitting piston disc 14 and/or the filter paper 20, which may be of slightly larger diameter than disc 14 as described, exert a sweeping action along the entire inner surface of walls 11, thereby picking up any precipitate deposited on said walls and thereby bringing about an extremely quantitative recovery of precipitate in a rapid and neat fashion and with a minimum of scraping.

Thus an important advantage is obtained over filtering devices previously known, such as the standard Buchner funnel, because in the devices of the prior art the entire precipitate had to be scraped from the funnel by means of a spatula, rubber policeman or the like, or the entire funnel had to be inverted and the precipitate loosened by tapping. Any of these awkward manipulations brought about more or less severe losses, caused liquor backwash onto the filter and thereby ruled out the use of such filtering devices in the quantitative preparation of expensive chemicals as well as in analytical work. In contrast to known filtering devices, my novel funnel assembly allows the precipitate to be recovered quantitatively by the expedient of pushing disc 14 into a readily accessible position where it is substantially flush with the upper edge of walls 11, avoiding completely any need for recovering precipitate from the vertical walls in separate manipulations such as washing down and scraping. Also my novel funnel greatly facilitates thorough cleaning thereof.

Another aspect of my invention involves the use of superatmospheric pressure to accelerate the rate of filtration whereas such means had not been conveniently utilizable with relatively small-scale filters known previously. I have now discovered that, by constructing the cylinder walls 11 with precision as described hereinbefore, a second piston can be fitted to the funnel from above so that mechanical or pneumatic pressure can be applied to the top of the filter cake in order to express liquid from solids which tend to retain much of the mother liquid. In fact, a duplicate unit consisting essentially of disc 14 with attached tube 16 (not provided with any perforation 28) can be used for this purpose by inserting it into the cylinder walls 11 in an inverted position, the end of tube 4 being connected to a suitable source of high-pressure gas or fluid.

Furthermore, the movable member consisting of disc 14 with tube 16 especially where said disc is made of sintered or porous material, can be used by itself in the manner of the microchemist's filter stick, that is, tube 16 can be attached directly by means of flexible tubing to a vacuum bottle or the like and the member immersed in an inverted position in a vessel containing a suspension from which liquid is to be removed.

Still other modifications of and uses for the filtering device described hereinbefore will be apparent to those skilled in the art. Thus it is to be understood that the embodiment of the invention as shown and described, and the modification thereof mentioned in the specification were given only for purposes of illustration, rather than limitation and it will be understood that many other embodiments of the invention may be constructed which come within the scope of the appended claims. So, for instance, the principles of the new device described herein may be readily applied to coffee-makers of the Silex type, permitting the operator to dispose of coffee grounds thoroughly and all at once, without any need for repeated rinsing and separate handling thereof prior to disposal.

What I claim as my invention is:

1. In a filtering device, the improvement comprising in combination an open-top receptacle having an opening in its bottom and a closely fitting permeable piston member slidably mounted therein, said piston member having a stem depending therefrom, which stem passes through said receptacle bottom opening permitting passage of liquid therethrough and having a length at least sufficient to move the piston member into flush position with the free edge of the receptacle.

2. In a filtering device, the improvement comprising in combination an open-top receptacle having an opening in its bottom and a closely fitting piston member slidably mounted therein, said piston member being adapted to support a filter paper and having a perforation in axial direction, and coaxially with said perforation a tubular stem depending from said piston member, said stem passing through the receptacle bottom opening and having a length at least sufficient to move the piston member into flush position with the free edge of the receptacle.

3. In a filtering device, the improvement comprising in combination an open-top receptacle having an opening in its bottom and a closely fitting perforated piston member slidably mounted therein, said piston member being adapted to support filter paper and having a stem depending therefrom, which stem passes through said receptacle bottom opening permitting passage of liquid therethrough and having a length at least sufficient to move the piston member into flush position with the free edge of the receptacle.

4. A filtering device according to claim 2 wherein the upper surface of the filter paper supporting piston member is provided with a system of communicating narrow grooves leading to the perforation in said piston member.

5. In a filtering device, the improvement comprising in combination an open-top receptacle having an opening in its bottom and a closely fitting permeable piston member slidably mounted therein, said piston member having a tubular stem depending therefrom which stem passing tightly through the receptacle bottom opening, between the receptacle bottom and the piston member an intermediate space surrounding the base of said tubular stem and in this tubular stem at least one perforation connecting said intermediate space with the tubular conduit in said stem which stem has a length at least sufficient to move the piston into flush position with the free edge of the receptacle.

6. In a filtering device, the improvement comprising in combination an open-top receptacle having an opening in its bottom and a closely fitting perforated piston member slidably mounted therein, said piston member having a tubular stem depending therefrom which stem passes tightly through the receptacle bottom opening, between the receptacle bottom and the piston member and intermediate space surrounding the base of said tubular stem and in this tubular stem at least one perforation connecting said intermediate space with the tubular conduit in said stem which stem has a length at least sufficient to move the piston into flush position with the free edge of the receptacle.

CHARLES LEANDRO LIGHTFOOT, Jr.

REFERENCES CITED

The following references are of record in the file of this patent:

UNITED STATES PATENTS

| Number | Name | Date |
| --- | --- | --- |
| 472,547 | Nordtmeyer | Apr. 12, 1892 |
| 594,013 | Holthaus | Nov. 23, 1897 |
| 661,493 | Case | Nov. 13, 1900 |
| 1,463,067 | Crary | July 24, 1923 |
| 1,705,908 | De Witt | Mar. 19, 1929 |
| 2,360,455 | Vilter | Oct. 17, 1944 |
| 2,379,101 | Post | June 26, 1945 |

FOREIGN PATENTS

| Number | Country | Date |
| --- | --- | --- |
| 62,995 | Germany | July 1, 1892 |
| 188,243 | Great Britain | Nov. 9, 1922 |
| 612,264 | Germany | Apr. 16, 1935 |